United States Patent
Kim

(10) Patent No.: US 7,354,013 B2
(45) Date of Patent: Apr. 8, 2008

(54) IDLER FOR TAPE RECORDER

(75) Inventor: Bong-Joo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 10/990,448

(22) Filed: Nov. 18, 2004

(65) Prior Publication Data

US 2005/0103915 A1 May 19, 2005

(30) Foreign Application Priority Data

Nov. 19, 2003 (KR) .................. 10-2003-0082056

(51) Int. Cl.
*G11B 15/32* (2006.01)

(52) U.S. Cl. ..................................... 242/356; 360/96.3

(58) Field of Classification Search ............... 242/356, 242/356.3; 360/96.3, 96.4
See application file for complete search history.

(56) References Cited

U.S. PATENT DOCUMENTS 7,048,219 B2 * 5/2006 Kim et al. ................. 242/340

FOREIGN PATENT DOCUMENTS

| KR | 1993-3388   | 2/1993 |
| KR | 1998-031752 | 8/1998 |

* cited by examiner

*Primary Examiner*—John Q. Nguyen
(74) *Attorney, Agent, or Firm*—Roylance, Abrams, Berdo & Goodman, L.L.P.

(57) ABSTRACT

Disclosed is an idler for a tape recorder that can selectively transmit a driving force from a capstan motor to a take-up reel or a supply reel depending upon a rotational direction of the capstan motor. The idler includes an idler gear connected to either of the take-up reel and the supply reel, and a gear supporting plate, provided with a ⊂-shaped portion or U-shaped portion, for rotatably supporting the idle gear. The idler gear is provided with a convex portion or a concave portion formed at both ends of a rotary center thereof, and the gear supporting plate is provided with a convex portion or a concave portion corresponding to the convex portion or concave portion of the idler gear.

8 Claims, 3 Drawing Sheets

IDLER FOR TAPE RECORDER

PRIORITY

This application claims the benefit under 35 U.S.C. § 119(a) of Korean Patent Application No. 2003-82056, filed on Nov. 19, 2003, the entire contents of which are incorporated herein by reference.

BACKGROUND OF THE INVENTION

1. Field of the Invention

The present invention relates generally to a tape recorder. More particularly, the present invention relates to an idler for a tape recorder for receiving a driving force from a capstan motor and selectively transmitting the driving force to either of a pair of reels.

2. Description of the Related Art

In general, a tape recorder, such as video tape recorder, camcorder, among others, is an apparatus for recording and reproducing image and sound data on and from a magnetic tape that is wound around a pair of reels to move along a certain path. In such a tape recorder, an idler is connected to either of the reels to selectively wind the magnetic tape around the reel in a forward or reverse direction according to a rotational direction of the capstan motor.

FIGS. 1 and 2 show one example of a conventional idler for a tape recorder. Referring to FIGS. 1 and 2, the idler includes a gear supporting plate 1, an idler gear 5, and an idler shaft 8. The gear supporting plate 1 is installed to a base plate (not shown), and supports the idle gear 5 and a pulley gear (not shown) to which a driving force is transmitted from a capstan motor (not shown). The gear supporting plate 1 is rotated around a shaft (not shown) of the pulley gear assembled into a shaft hole 4 according to a rotational direction of the capstan motor. The gear supporting plate 1 is provided with an S-shaped portion 3 formed in a portion of the gear supporting plate, to which the idler shaft 8 is installed, as shown in FIG. 2.

The idler gear 5 receives a driving force from the capstan motor through the pulley gear, and selectively transmits the driving force to either of a pair of reels (a take-up reel and a supply reel). Also, the idler gear 5 rotates on the gear supporting plate 1 by the idler shaft 8.

The idler gear 5 is rotatably supported by the idler shaft 8 secured to the gear supporting plate 1 via caulking. The S-shaped portion 3 of the gear supporting plate 1 functions as a leaf spring by adjusting the length of the idler, so that the idler gear 5 is urged against the gear supporting plate 1 to generate a frictional force.

In the conventional idler, if the rotational direction of the capstan motor is changed, torque is generated due to the frictional force generated between the idler gear 5 and the gear supporting plate 1. As a result of the change in rotational direction of the capstan motor, the rotational direction of the idler is changed. The idler gear 5 is connected to either of the pair of reels according to the rotational direction of the capstan motor, such that the power of the capstan motor is selectively transmitted to the take-up reel or the supply reel to allow the magnetic tape to be wound in a forward direction or a reverse direction.

In the conventional idler for the tape recorder, the idler shaft 8 is separately manufactured and then assembled to the idler gear 5, and the idler shaft 8 is secured to the gear supporting plate 1 by means of caulking. Further, frictional force is generated between the idler shaft 8 and the S-shaped portion 3 of the gear supporting plate 1. As a result of the separate manufacturing and assembling steps, the frictional force is difficult to adjust, requires many different components and subsequently increases the cost of manufacturing.

SUMMARY OF THE INVENTION

The present invention has been developed in order to solve the drawbacks discussed above and other problems associated with conventional idlers and to provide other advantages. An aspect of the present invention is to provide an idler for a tape recorder that can generate a frictional force only by a resilient force of a gear supporting plate and thus does not require a separate idler shaft, thereby reducing the number of components and the cost associated with the manufacturing process.

The foregoing and other objects and advantages are substantially realized by providing an idler for a tape recorder for selectively transmitting a driving force from a capstan motor to either a take-up reel or a supply reel depending upon the rotational direction of the capstan motor. The idler for a tape recorder according to an embodiment of the present invention comprises an idler gear connected to either the take-up reel or the supply reel, and a gear supporting plate, provided with a ⊂-shaped portion or U-shaped portion, for rotatably supporting the idler gear.

According to an embodiment of the present invention torque to be applied to the idler gear can be controlled by adjusting a bending angle of the idler gear. The idler gear can be provided with a convex portion or a concave portion formed at both ends of a rotary center thereof, and the gear supporting plate is provided with a convex portion or a concave portion corresponding to the convex portion or concave portion of the idler gear.

The idler according to an embodiment of the present invention further comprises a separate frictional surface provided between the idler gear and the gear supporting plate. According to another aspect of the present invention, there is provided a tape recorder having an idler, a capstan motor, a take-up reel and a supply reel. The idler according to another embodiment of the present invention comprises an idler gear connected to either the take-up reel or the supply reel, and a gear supporting plate, provided with a ⊂-shaped portion or U-shaped portion, for applying torque to the idler gear and rotatably supporting the idler gear as well.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
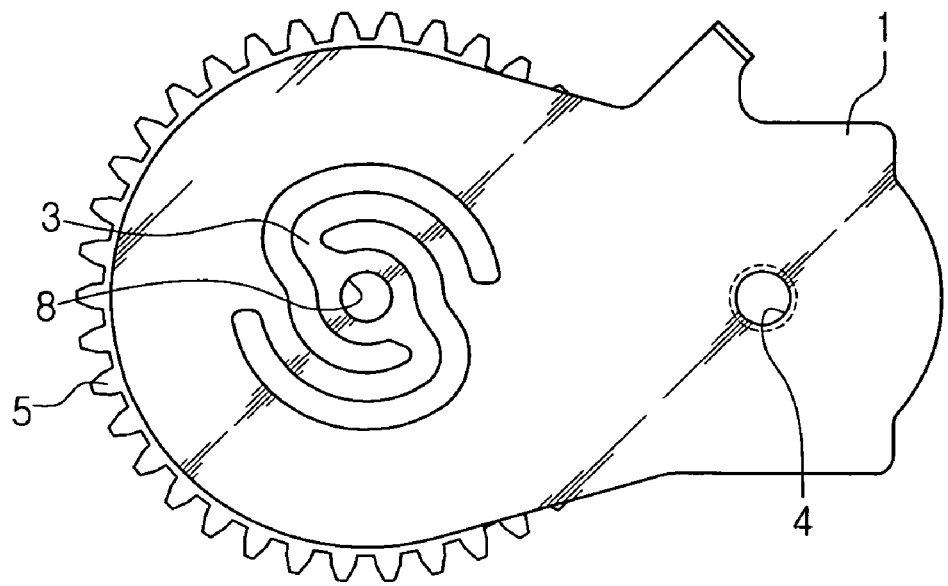
FIG. 1 is a top view of a conventional idler for a tape recorder.
Figure 2:
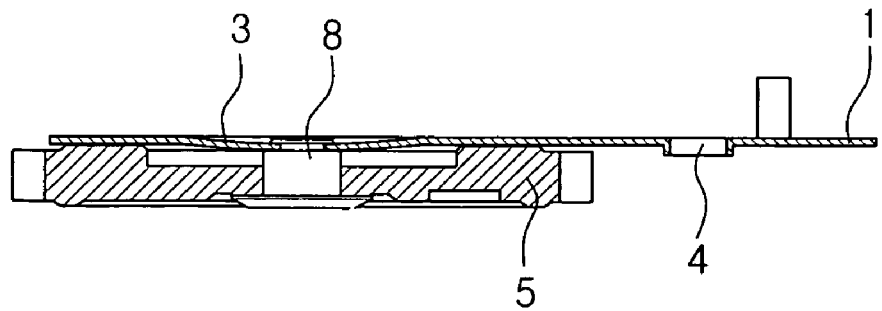
FIG. 2 is a cross-sectional view of the idler as shown in FIG. 1.

Certain embodiments of the present invention will be described in greater detail with reference to the accompanying drawings.

In the following description, like drawing reference numerals are used for the like features and structures throughout the drawing figures. The matters defined in the description such as a detailed construction and elements are provided to assist in a comprehensive understanding of the invention. It should be understood that the descriptions contained herein are intended to be exemplary. Those of ordinary skill in the art will appreciate that various changes and modifications can could be made to the embodiments described herein and still remain within the inventive concept. Also, well-known functions or constructions are not described in detail for purposes of conciseness.

Figure 3:
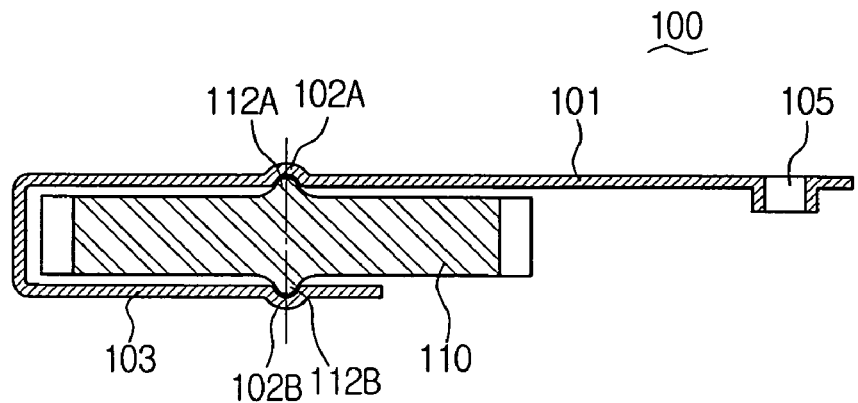
FIG. 3 is a cross-sectional view of an idler for a tape recorder according to an embodiment of the present invention.

FIG. 3 is a cross-sectional view of an idler 100 for a tape recorder according to a preferred embodiment of the present invention. Referring to FIG. 3, the idler 100 includes a gear supporting plate 101 and an idler gear 110. The gear support plate 101 is installed to a base plate (not shown), and supports a pulley gear 55 (see FIG. 6) and the idler gear 110 to which a driving force is transmitted from a capstan motor 20 (see FIG. 6). The gear supporting plate 1 is rotated around a pulley gear shaft 60 (FIG. 6) assembled into a hole 105 according to the rotational direction of the capstan motor 20, so as to cause the idler gear 110 to mesh with either the take-up reel 80 (see FIG. 6) or the supply reel 90 (see FIG. 6). The gear supporting plate 101 is provided with a ⊂-shaped portion 103 to which the idler gear 110 is assembled. The ⊂-shaped portion 103 can be replaced by any shape including a U-shape which can urge against the idler gear 110.

Rotation supporting portions 102A and 102B, to which the idler gear 110 of the ⊂-shaped portion 103 is installed, are formed with concave portions. The concave portions of the rotation supporting portions 102A and 102B have a shape and a size that corresponds to those of convex portions formed at both ends 112A and 112B of a rotary center of the idler gear 110. The concave portions of the rotation supporting portions 102A and 102B and the convex portions 112A and 112B can be of any shapes which can support the rotation of the idler gear 110. Also, in the embodiment of the present invention as shown in FIG. 3, the rotation supporting portions 102A and 102B of the gear supporting plate 101 are formed in a concave shape, and the rotary centers 112A and 112B formed at both ends of the idler gear 110 are formed in a convex shape. Alternatively, the gear supporting plate 101 can be formed with a convex rotation supporting portion, and the idler gear 110 can be formed with a concave rotary center. As a further modification, the rotary center 112A of the idler gear 110 can be formed in a convex shape and the rotation supporting portion 102A can be concave (as shown in FIG. 3), and the rotary center 112B of the idler gear 110 can be formed in a concave shape and the rotation supporting portion 102B can be convex (or visa-versa).

Figure 4:
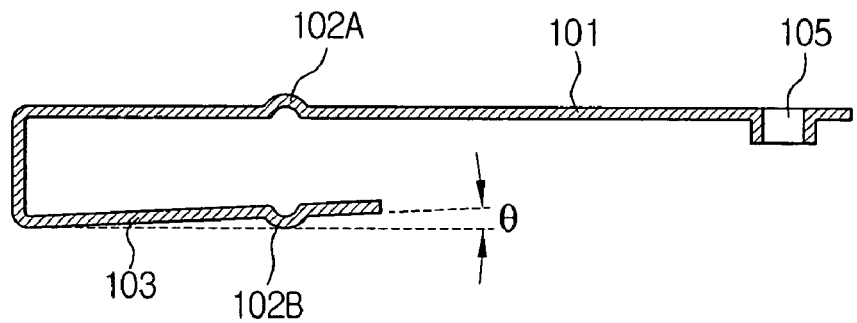
FIG. 4 is a cross-sectional view depicting a bending angle of the gear supporting plate of the idler for a tape recorder shown in FIG. 3.

The gear supporting plate 101 utilizes a resilient force of the ⊂-shaped or U-shaped portion 103 to generate a frictional force acting between the idler gear 110 and the gear supporting plate 101. The intensity of the frictional force acting between the gear supporting plate 101 and the idler gear 110 is dependent upon the resilient force of the ⊂-shaped or U-shaped portion 103 of the gear supporting plate 101. The torque of the idler 100 is determined from the resilient force of the ⊂-shaped or U-shaped portion 103 of the gear supporting plate 101. Therefore, as shown in FIG. 4, the frictional force acting between the gear supporting plate 101 and the idler gear 110 can be controlled through the adjustment of a bending angle θ of the shaped portion 103. Frictional forces are generated between the gear supporting plate 101 and the idler gear 110 at the point of contact between the concave portions of the rotation supporting portions 102A and 102B of the gear supporting plate 101 and the convex portions of the rotary centers 112A and 112B of the idler gear 110. The frictional force acting between the contact surfaces generates the torque to cause the idler 100 to rotate around the pulley gear shaft 60 installed into the shaft hole 105.

Figure 5:
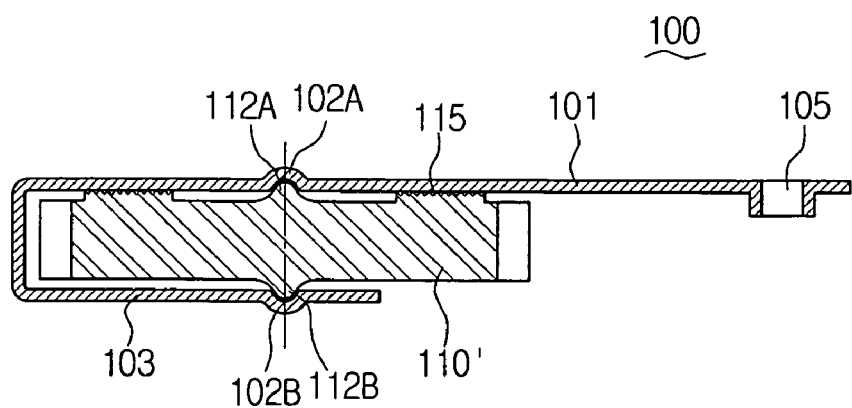
FIG. 5 is a cross-sectional view of an idler for a tape recorder according to another embodiment of the present invention.

In order to adjust the torque of the idler 100, the idler 100 for the tape recorder according another embodiment of the present invention includes an additional frictional surface 115 between a gear supporting plate 101 and an idler gear 110' as shown in FIG. 5. The frictional surface 115 can be provided on either or both of the gear supporting plate 101 and the idler gear 110'. In this embodiment of the present invention, the frictional force between the gear supporting plate 101 and the idler gear 110' can be controlled by adjusting a frictional coefficient of the fictional surface 115, in addition to the method of adjusting the bending angle θ of the gear supporting plate 101, thereby adjusting the torque of the idler 100.

Figure 6:
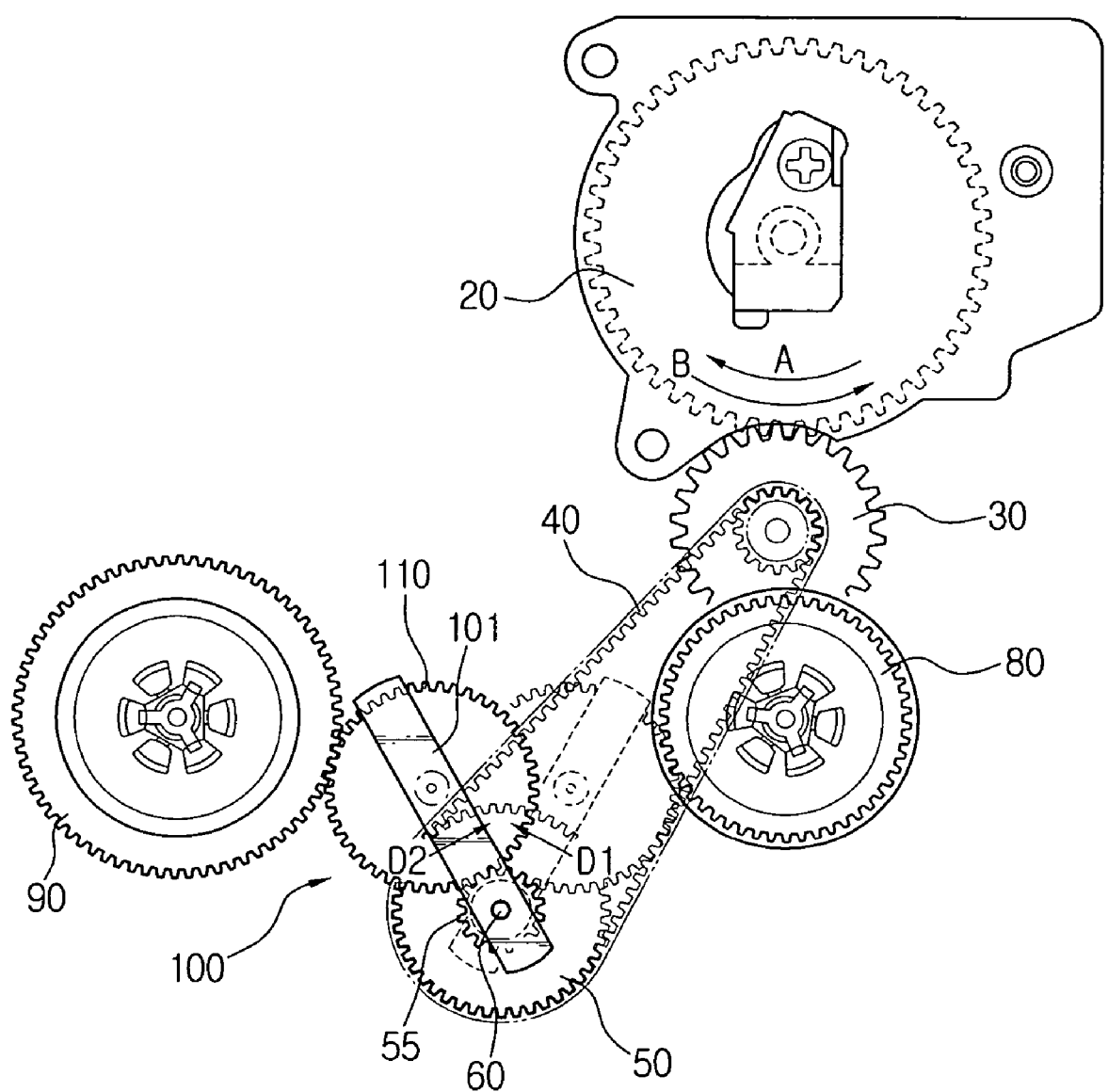
FIG. 6 is a top view of components associated with a tape recorder depicting operation of an idler of a tape recorder according to an embodiment of the present invention.

Operation of selectively transmitting the driving force from the capstan motor to the take-up reel and the supply reel through the idler of the tape recorder will now be described with reference to FIG. 6. Referring to FIG. 6, when the capstan motor 20 is rotated in a clockwise direction (indicated by an arrow A), a timing pulley 50 is rotated in a counterclockwise direction by a capstan gear 30 coupled to the capstan motor 20 and a timing belt 40 (capstan gear 30 rotates counterclockwise, as does timing belt 40). The timing pulley 50 is coaxially coupled to the pulley gear shaft 60 to which a pulley gear 55 is installed. When the timing pulley 50 rotates in the counterclockwise direction, the pulley gear 55 is also rotates in the counterclockwise direction. The idler gear 110, because it is meshed with the pulley gear 55, rotates in a clockwise direction. If the idler gear 110 rotates in the clockwise direction, the frictional force acting between the gear supporting plate 101 and the idler gear 110 acts in the direction of arrow D1. As such, the gear supporting plate 101 receives a force to rotate the gear supporting plate 101 around the pulley gear shaft 60 in the counterclockwise direction. If the idler gear 110 is meshed with the take-up reel 80, the gear support plate 101 with idler gear 110 supported rotates in the counterclockwise direction, such that the idler gear 110 now becomes meshed with the supply reel 90. Therefore, if the capstan motor 20 rotates in the clockwise direction, the idler 100 also rotates in the counterclockwise direction, and the idler gear 110 becomes meshed with the supplying reel 90 to transmit the power from the capstan motor 20 to the supply reel 90.

Alternatively, if the capstan motor 20 rotates in a counterclockwise direction (indicated by an arrow B), the timing pulley 50 rotates in the clockwise direction by the capstan gear 30 coupled to the capstan motor 20 and the timing belt 40. When the timing pulley 50 rotates in the clockwise direction, the pulley gear 55 also rotates in the clockwise direction. Because the idler gear 110 is meshed with the pulley gear 55, it will also rotate in the counterclockwise direction, and the frictional force acts on the gear support plate 101 by the idler gear 110 in the direction of arrow D2. Consequently, the gear supporting plate 101 rotates around the pulley gear shaft 60 in the clockwise direction, such that the idler gear 110 becomes meshed with the take-up reel 80. Therefore, the driving force is transmitted from the capstan motor to the take-up reel 80, so that the take-up reel 80 rotates in the clockwise direction. If the take-up reel 80 rotates in the clockwise direction, the magnetic tape is moved in the forward direction to be wound around the take-up reel 80.

As described above, the idler 100 for a tape recorder according to an embodiment of the present invention rotates around the pulley gear shaft 60 depending upon the rotational direction of the capstan motor 20. The rotation of the idler 100 due to the rotation direction of the capstan motor 20 selectively transmits the driving force from the capstan motor to the take-up reel 80 or the supplying reel 90 to wind the magnetic tape.

The foregoing embodiments of the present invention and advantages are merely exemplary and are not to be construed as limiting the present invention. The present teaching can be readily applied to other types of apparatuses. Also, the description of the exemplary embodiments of the present invention are intended to be illustrative, and not to limit the scope of the claims, and their many alternatives, modifications, and variations will be apparent to those skilled in the art.

What is claimed is:

1. An idler for a tape recorder for selectively transmitting a driving force from a capstan motor to a take-up reel or a supply reel depending upon a rotational direction of the capstan motor, comprising:
    an idler gear connected to either of the take-up reel and the supply reel; and
    a gear supporting plate, provided with a ⊂-shaped portion or U-shaped portion, for rotatably supporting top and bottom surfaces of the idler gear at a first frictional surface; wherein
    the idler gear is provided with convex or concave portions formed at both ends of a rotary center thereof; and
    the gear supporting plate is provided with complementary convex or concave portions corresponding to the convex or concave portions of the idler gear.

2. The idler as claimed in claim 1, wherein the gear supporting plate comprises:
    a bending angle that can be adjusted to control torque to be applied to the idler gear by the gear supporting plate.

3. The idler as claimed in claim 1, further comprising:
    a second frictional surface provided between the idler gear and the gear supporting plate.

4. A tape recorder having an idler, a capstan motor, a take-up reel and a supply reel, the idler comprising:
    an idler gear connected to either of the take-up reel and the supply reel; and
    a gear supporting plate, provided with a ⊂-shaped portion or U-shaped portion, for applying torque to the idler gear and rotatably supporting top and bottom surfaces of the idler gear at a first frictional surface; wherein
    the idler gear is provided with convex or concave portions formed at both ends of a rotary center thereof; and
    the gear supporting plate is provided with complementary convex or concave portions corresponding to the convex or concave portions of the idler gear.

5. The idler as claimed in claim 4, further comprising:
    a second frictional surface provided between the idler gear and the gear supporting plate.

6. The idler as claimed in claim 4, wherein the gear supporting plate comprises:
    a bending angle that can be adjusted to control torque to be applied to the idler gear by the gear supporting plate.

7. An idler for a tape recorder for selectively transmitting a driving force from a capstan motor to a take-up reel or a supply reel depending upon a rotational direction of the capstan motor, comprising:
    an idler gear connected to either of the take-up reel and the supply reel; and
    a gear supporting plate, provided with a ⊂-shaped portion or U-shaped portion, for rotatably supporting and frictionally contacting top and bottom surfaces of the idler gear at a first frictional surface.

8. A tape recorder having an idler, a capstan motor, a take-up reel and a supply reel, the idler comprising:
    an idler gear connected to either of the take-up reel and the supply reel; and
    a gear supporting plate, provided with a ⊂-shaped portion or U-shaped portion that rotatably supports the idler gear and applies torque to the idler gear by frictionally contacting top and bottom surfaces of the idler gear.

* * * * *